(12) United States Patent
Petelka

(10) Patent No.: US 6,634,697 B1
(45) Date of Patent: Oct. 21, 2003

(54) WIDE CLEARANCE SLIDING TARPING SYSTEMS FOR FLAT BED TRAILERS OF TRUCK BODIES

(75) Inventor: Brian W. Petelka, Ontario (CA)

(73) Assignee: Aero-Kit Industries Inc., Burlington (CA)

( * ) Notice: Subject to any disclaimer, the term of this patent is extended or adjusted under 35 U.S.C. 154(b) by 0 days.

(21) Appl. No.: 10/188,831

(22) Filed: Jul. 5, 2002

(51) Int. Cl.$^7$ .................................................. B60P 7/02
(52) U.S. Cl. .................................. 296/100.12; 296/105
(58) Field of Search .............................. 296/105, 104, 296/100.12, 100.11

(56) References Cited

U.S. PATENT DOCUMENTS

| | | | |
|---|---|---|---|
| 4,711,484 A | 12/1987 | Tuerk | |
| 4,902,064 A | 2/1990 | Tuerk et al. | |
| 5,429,408 A | 7/1995 | Henning et al. | |
| 5,538,313 A | * 7/1996 | Henning | 296/100.12 |
| 5,924,759 A | * 7/1999 | DeMonte et al. | 296/100.12 |

* cited by examiner

Primary Examiner—Joseph D. Pape
(74) Attorney, Agent, or Firm—Nixon Peabody LLP; Jeffrey L. Costellia

(57) ABSTRACT

A tarpaulin support for a tarpaulin system that turns a flat bed trailer into a fully covered van and back again into an open flat bed trailer. The support is comprised of an upper tubular bow of inverted U-shape to extend laterally across a trailer and, each side of the bow having a lateral, downwardly extending tubular arm. A structural member is secured to the tubular bow along its outer periphery and extends below the free ends of the arms of the tubular bow, the structural member provided with structure to secure thereto peripheral portions of tarpaulin sections for covering the trailer. A pair of planar bases are associated with the bow, one on each side and, each base having a roller arrangement secured thereto for sliding movement on a corresponding rail mounted on a corresponding side of the flat bed. Corrugated plate having vertically formed corrugations is secured to each structural member below the corresponding arm and its associated base. The corrugated plates have sufficient structural strength to support the tubular bow and its structural member and associated tarpaulin sections when in position. The overall thickness of the corrugated plate between opposite surfaces is less than that of the tubular bow.

14 Claims, 7 Drawing Sheets

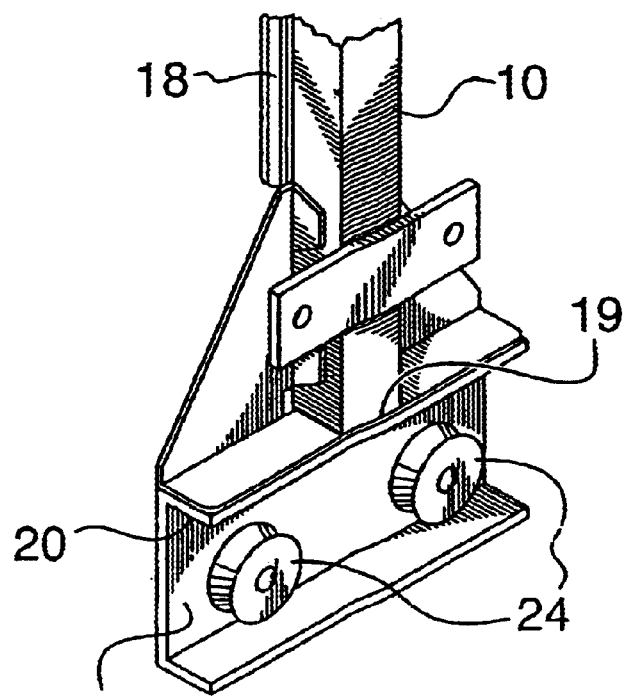
FIG. 4
PRIOR ART
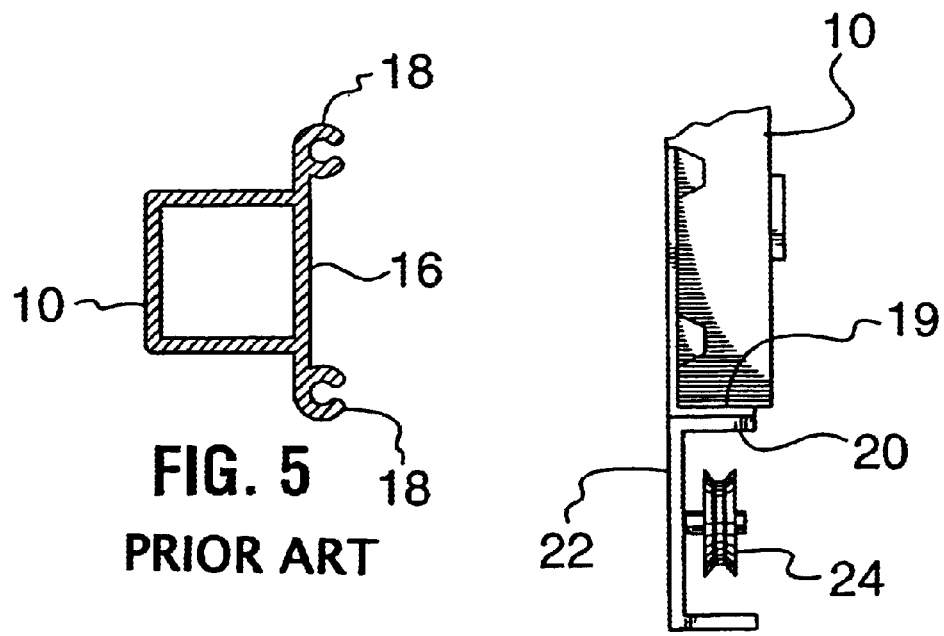
FIG. 5
PRIOR ART
FIG. 6
PRIOR ART

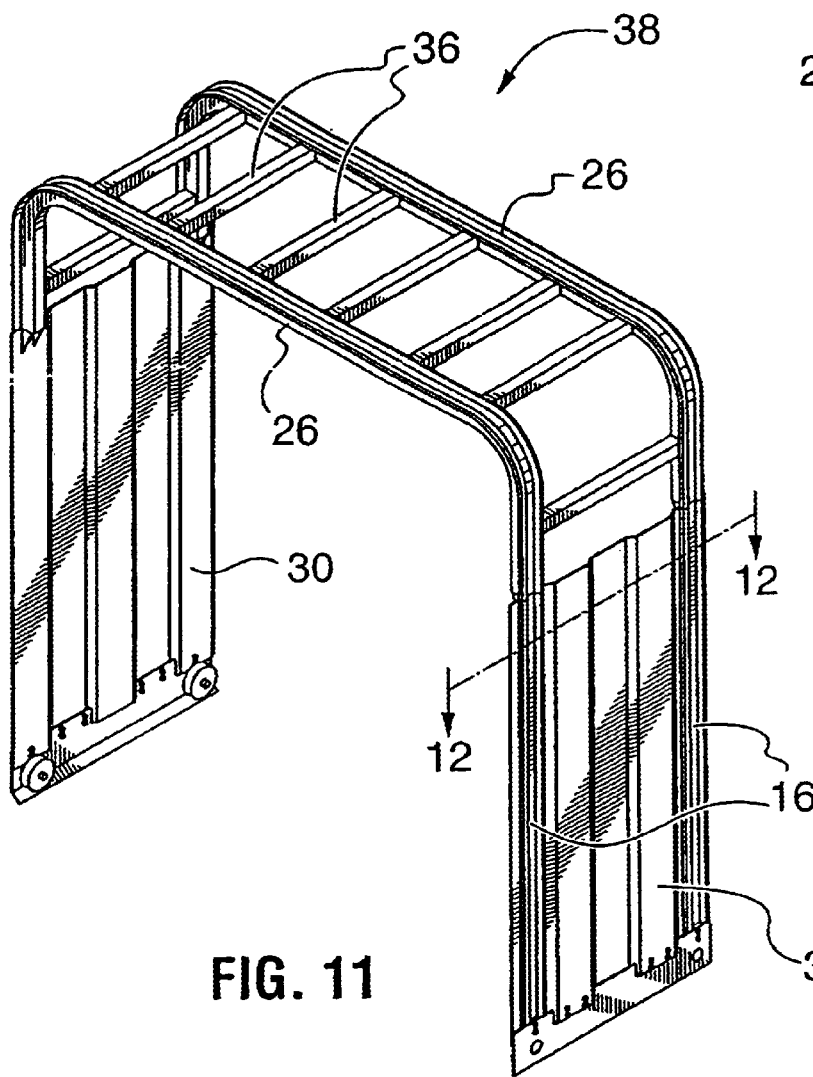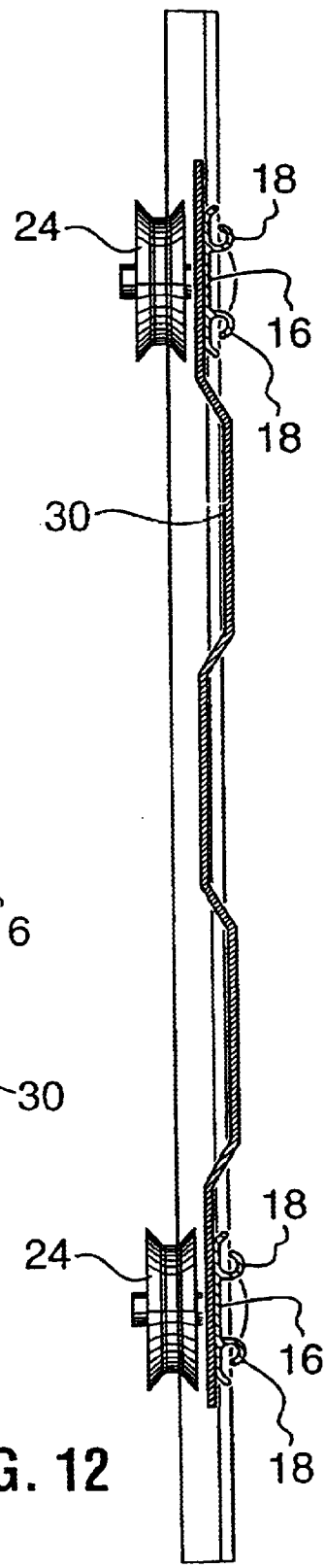
FIG. 11
FIG. 12

WIDE CLEARANCE SLIDING TARPING SYSTEMS FOR FLAT BED TRAILERS OF TRUCK BODIES

FIELD OF THE INVENTION

The present invention relates to a tarpaulin support system for turning a flat bed trailer into a fully covered van and back again into an open flat bed trailer.

BACKGROUND OF THE INVENTION

The present invention relates to improvement on the tarpaulin systems described and illustrated for example in U.S. Pat. No. 4,711,484 of Tuerk, issued Dec. 8, 1987, U.S. Pat. No. 4,902,064 of Tuerk et al. issued Feb. 20, 1990 and U.S. Pat. No. 5,429,408 of Henning et al. issued Jul. 4, 1995. These patents describe and illustrate tarpaulin support systems of the type that provide a plurality of rigid, roller mounted, inverted U-shaped bows which extend laterally from one side to the other of the flat bed trailer, the rollers sliding longitudinally on horizontally disposed rails on either side of the trailer. The bows are of tubular construction, often square in cross-section, and have mounted along their outer peripheries, structural members having channels to securely but releasably grip and retain peripheral portions of tarpaulin sections. The tubular bows, when carrying the tarpaulin sections, may be moved on the rails in either direction on the flat bed to collapse or extend outwardly the sections, in accordian style, to open or close the sides of the trailer. In this way, the trailer can be set up as either a fully covered trailer or an open, flatbed one.

With increasing costs of transportation, an effort has been made to consider how additional space can be provided on the flat bed portions of such trailers to maximize allowable legal width of transported cargo. The following specification teaches one such method.

SUMMARY OF THE INVENTION

In accordance with the present invention there is provided a tarpaulin support for a tarpaulin system that converts a flat bed trailer into a fully covered trailer and back again into an open flat bed trailer as desired. The support comprises an upper tubular bow of inverted U-shape to extend laterally across the trailer, each side of the bow having a lateral, downwardly-extending tubular arm. A structural member is secured to the tubular bow along its outer periphery and extends below the free ends of the arms of the tubular bow. The structural member is provided with means to secure thereto peripheral portions of tarpaulin sections for covering the trailer. A pair of planar bases are associated with the bow, one on each side, each base having roller means secured thereto for sliding movement on a different one of a corresponding rail mounted on a corresponding side of the flat bed. Corrugated plates having vertically formed corrugations are secured to each structural member below the corresponding arm and its associated base, the corrugated plates having sufficient structural strength to support the tubular bow and its structural member and associated tarpaulin sections when in position. The overall thickness of the corrugated plate between opposite surfaces is less than that of the tubular bow.

With this construction of tarpaulin support, because the tubular portion of the bow is restricted to the upper levels of the system, extra lateral space is provided on the flat bed trailer when the tarpaulin support is in covering position at the lower portions where the corrugated plates are positioned, than otherwise would be the case. The necessary structural strength for the system, in absence of the wrap-around tubing of the bows of the prior art devices, is accomplished through the use of these corrugated plates.

BRIEF DESCRIPTION OF THE DRAWINGS

These and other advantages of the invention will become apparent upon reading the following detailed description and upon referring to the drawings in which:

FIG. 4 is a perspective view of a lower portion of the tarpaulin support of FIG. 3;

FIG. 5 is a horizontal section view of the bow portion of the tarpaulin support of FIG. 3, taken a long line 5—5;

FIG. 6 is a partial front view of the lower portion of the tarpaulin support of FIG. 5;

FIG. 11 is a perspective view of an end or intermediate tarpaulin support section, to work in conjunction with supports of FIG. 5 in forming a complete tarpaulin support system in accordance with the present invention;

FIG. 12 is a section view of the tarpaulin support system of FIG. 11, along line 12—12.

Figure 1:
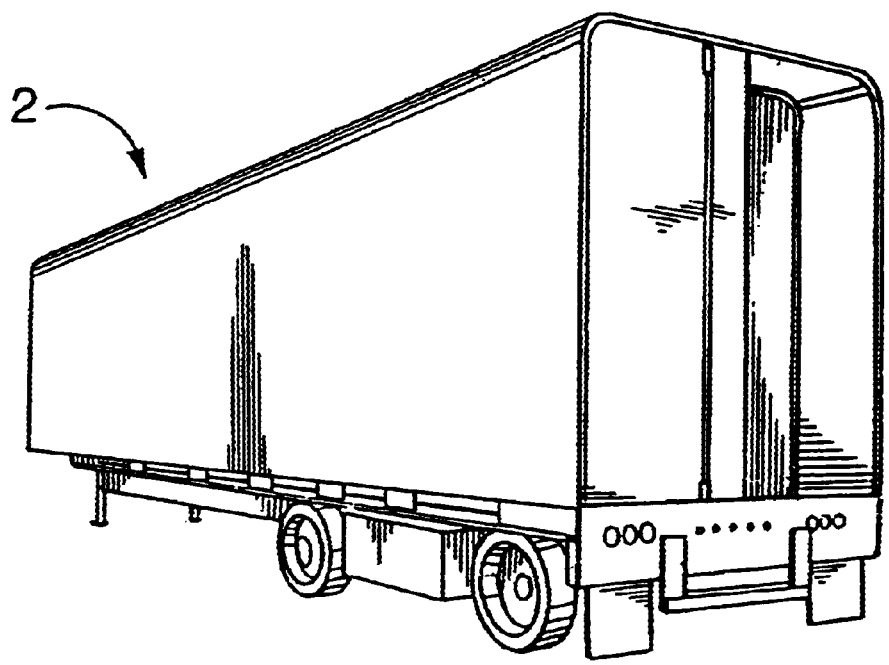
FIG. 1 is a perspective view from the side and rear, of a tarpaulin system incorporating tarpaulin supports in accordance with the present invention, in open position, fully covering a flat bed trailer.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 2:
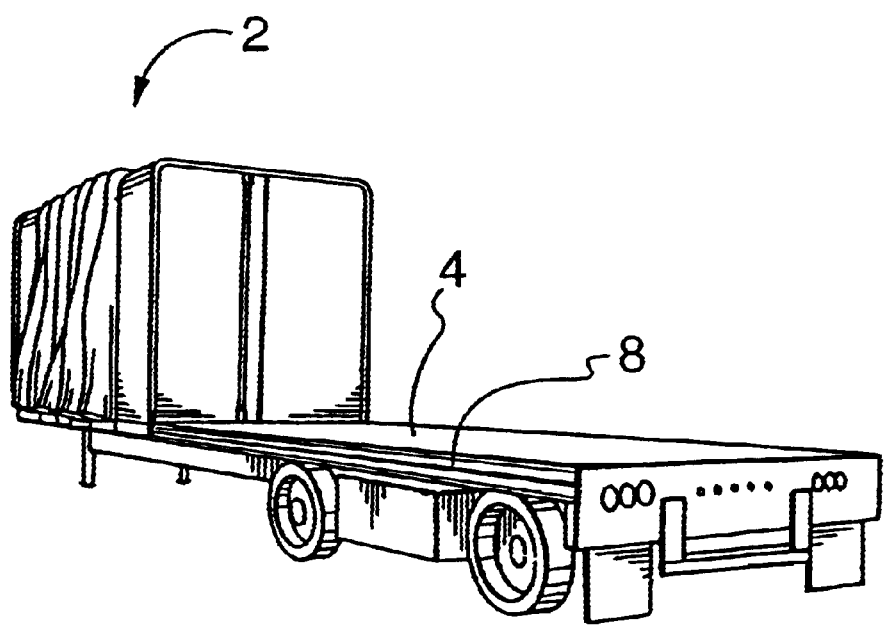
FIG. 2 is a similar perspective view of the system of FIG. 1 with the tarpaulin supports in closed position, leaving the flat bed open and obstructed from the sides.

Turning to FIGS. 1 and 2, there is illustrated a convertible tarpaulin system (2) of the general type for which the tarpaulin supports (3) (FIG. 7) and (38) (FIG. 11) of the present invention are intended. These tarpaulin systems are constructed so as to always cover a flat bed trailer (4) for example, hauled behind a truck cab (not shown), or an open truck body (not shown). System (2) is roller mounted on a rail (8), which is provided on each side of trailer (4), to move between a closed, trailer covering position as illustrated in FIG. 1 (this is the normal travel position), and an open position, as illustrated in FIG. 2, in which the trailer is essentially in its loading or unloading, flat bed state.

Figure 3:
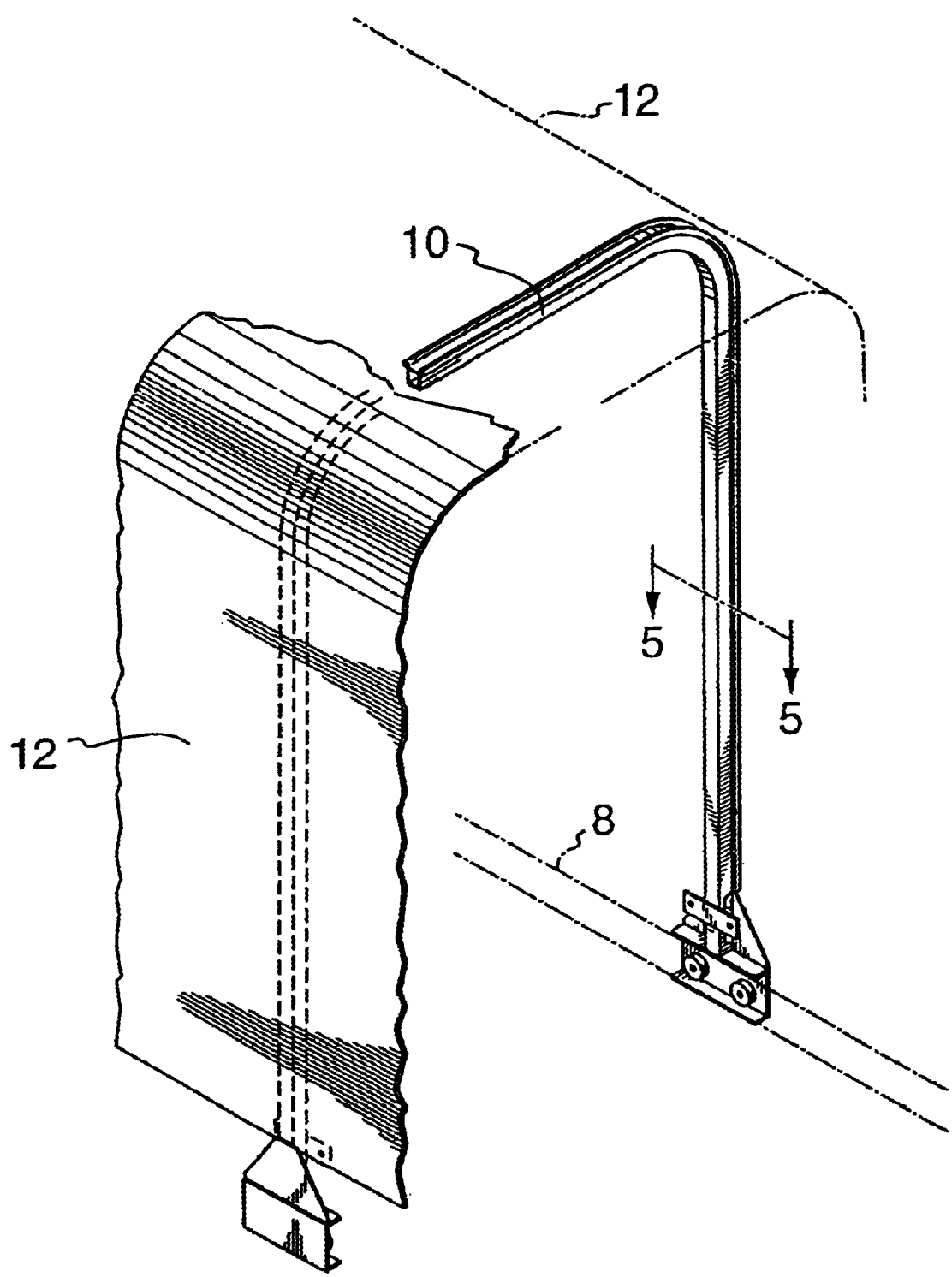
FIG. 3 is a partial perspective view of a conventional tarpaulin support previously used for such convertible flat bed trailer systems.

Conventionally, as illustrated in FIG. 3, tarpaulin supports have been made up of a plurality of bows (10) interconnected by tarpaulin sections (12). The bows normally of square cross-sectional configuration (FIG. 5) and of inverted U-shaped appearance when in position as illustrated. The bows are laterally mounted to extend across the flat bed trailer (4) as illustrated. Extending along its outer periphery, each bow is provided with a structural member (16) having side slots (18), each slot (18) constructed so as to releasably engage a beaded peripheral portion of a (different) tarpaulin section (12), each of the tarpaulin sections (12) extending on opposite sides to an adjacent tarpaulin support. As can be seen in FIGS. 4 and 6, to enable bows (10) to slide on rails (8), their ends are provided with feet (19) which are secured to horizontally extending flanges (20) of vertically disposed base plates (22) upon which are mounted a plurality of rollers (24), which rollers are supported and move on the corresponding rail (8).

Figure 7:
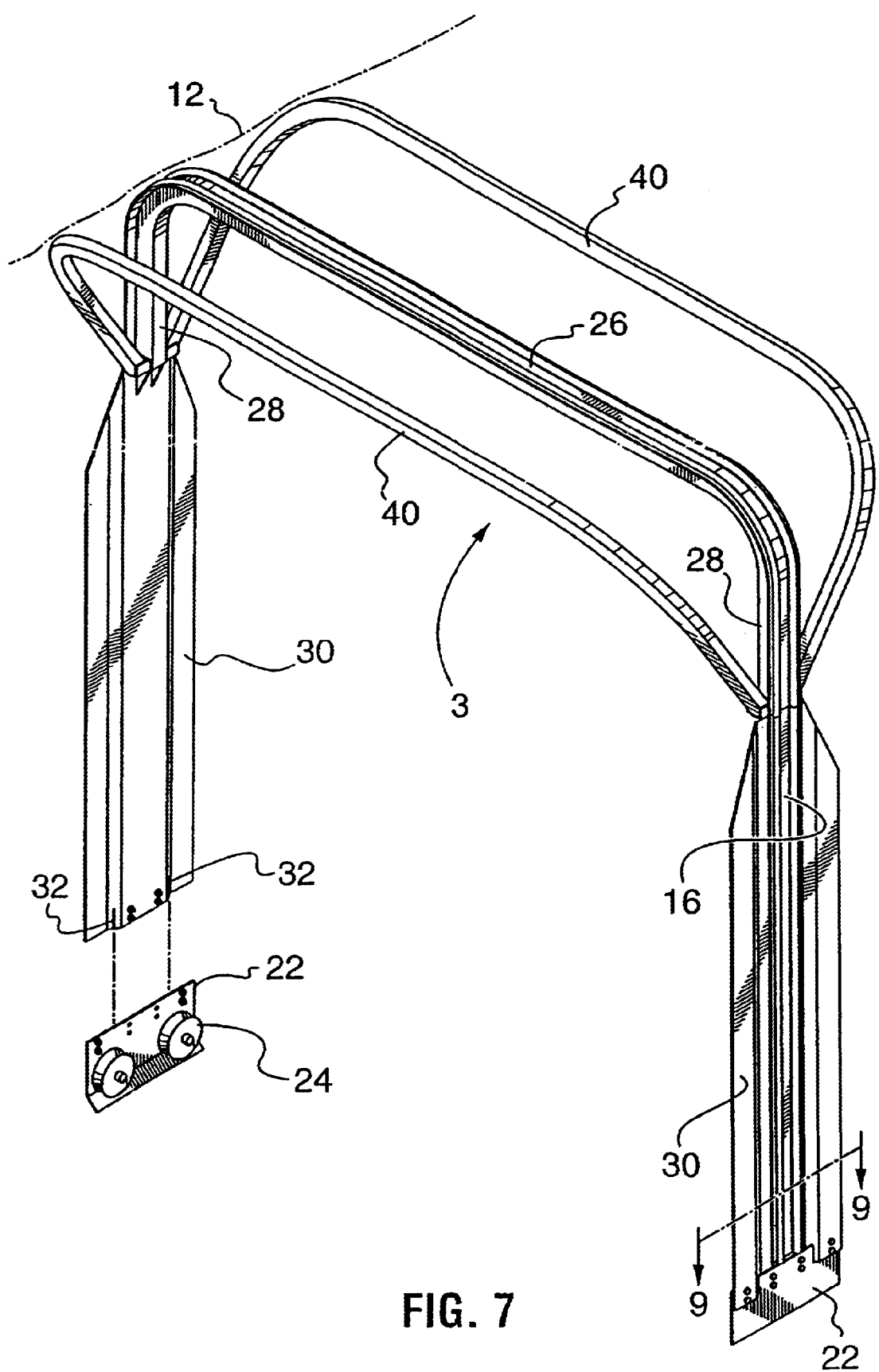
FIG. 7 is a perspective view partially exploded of a tarpaulin support in accordance with the invention.
Figure 8:
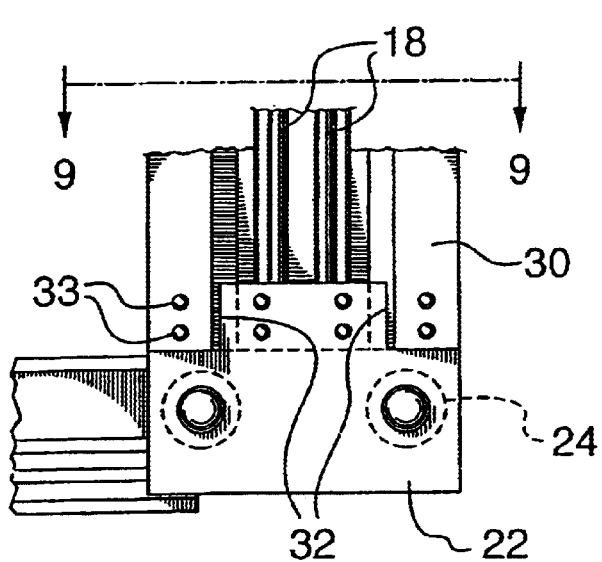
FIG. 8 is a partial front elevation view of a lower portion of the tarpaulin support of FIG. 7.
Figure 9:
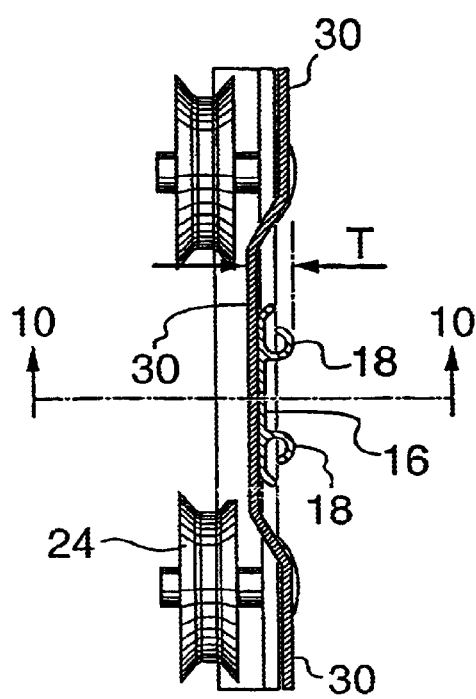
FIG. 9 is a section view along line 9—9 of the tarpaulin support of FIG. 7.
Figure 10:
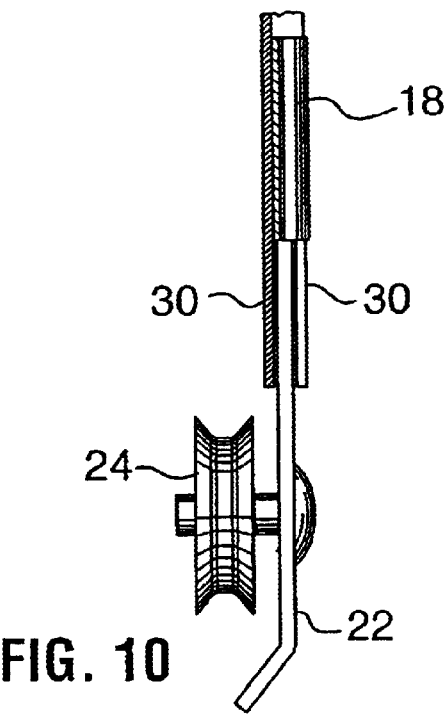
FIG. 10 is partial front view of the lower portion of the tarpaulin support of FIG. 7.

FIGS. 7 to 13 illustrate various aspects of the novel tarpaulin supports (3) according to the present invention. In FIG. 7, it can be seen that the upper portion of tarpaulin support (3) is formed of a conventional tubular bow portion (26), of square cross-section and inverted U-shaped configuration. Side arms (28) of support (3) however are significantly shorter. Structural members (16), for holding tarpaulin sections (12), are peripherally secured along outer portions of bow (26) and extend beyond the lower ends of arms (28) as illustrated. This provides a significant advantage in ease of manufacturing, since the support (3) can be extruded in conventional fashion, with the tubular portion extending along its length, and then an appropriate length of that tubular portion removed to leave an integral structural member (16) at each end extending along and beyond the remaining tubular portion (26).

To the inner surface of each structural member (16), where it extends below its corresponding arm (28), is secured a corrugated plate (30) which provides a frame structure of sufficient structural strength to support the upper tubular bow portion (26) side arms (28) and their corresponding structural members (16), and associated tarpaulin sections (12) when in position. The overall thickness (T) of this frame structure (FIG. 9), including its corrugations, between opposite surfaces, is less than that of the tubular bow, and preferably ¾ inch, so that portions of the tarpaulin support (3), when the system is in closed (covering) position as illustrated in FIG. 1, will provide additional, lateral space on the trailer flat bed interior (4), thereby enabling a greater cargo capacity and easier facility of handling cargo when being placed on or taken off of the flat bed trailer (4). (The plates (30) themselves may be, for example of 3/16 inch thickness aluminum, sheet or extrusion.)

A flat bed trailer system using the conventional supports of FIG. 3, provides approximately 102 inches of legal usable interior trailer deck width. By ensuring that frame plates (30) have a width, when the corrugations are taken into account, of no more than ¾ inch per side, the system of the present invention permits a greater, interior load clearance width of up to 1½ inches of the legal allowable exterior width. While this may seem small, in practical terms when considering handling of cargo being loaded and unloaded on a flat bed trailer incorporating the system to according to the present invention, and in permitting full legal width cargo to be carried on the flat bed, this increase in cargo handling is significant. It is also preferred that the arms (28) of bow (26) be no longer than 18 inches, to enhance, in a vertical sense, the cargo handling benefits of the present invention.

The corrugated structure of plates (30) also significantly facilitates and strengthens the securing of bow (26) and plate (30) to roller base plates (22). Instead of requiring the securing of bows (10) to flanges (20), (FIGS. 4 and 6) as was the case with conventional systems, by cutting aligned slots (32) in the corrugations in the lower portions of plates (30), and constructing base plates (22) without flanges (20), corrugated plates (30) can be easily seated on base plates (22) in a finger jointed arrangement and secured, for example by fasteners (33) through overlapping portions of the plates and bases (FIG. 8), in an extremely effective and secure manner.

It will be understood that by sliding together a plurality of adjacently spaced tarpaulin supports (3) in accordance with the present invention, which supports are interconnected by tarpaulin sections (12), each section (12) secured to adjacent pairs of tarpaulin supports (3), the tarpaulin supports (3) can be opened and closed, in accordion-like fashion, into either opened or closed position on the trailer flatbed.

To facilitate the opening and closing of supports (3), as illustrated in FIGS. 11 and 12, tarpaulin supports positioned at the end or in intermediate positions are preferably made of greater strength. In this case, corrugated plate (30) is of wider construction, and, at its front and rear edges are a spaced pair of bows (26) and associated structural members (16) secured thereto in parallel fashion. Braces (36) are secured to and extend across bows (26) to provide further support.

Figure 13:
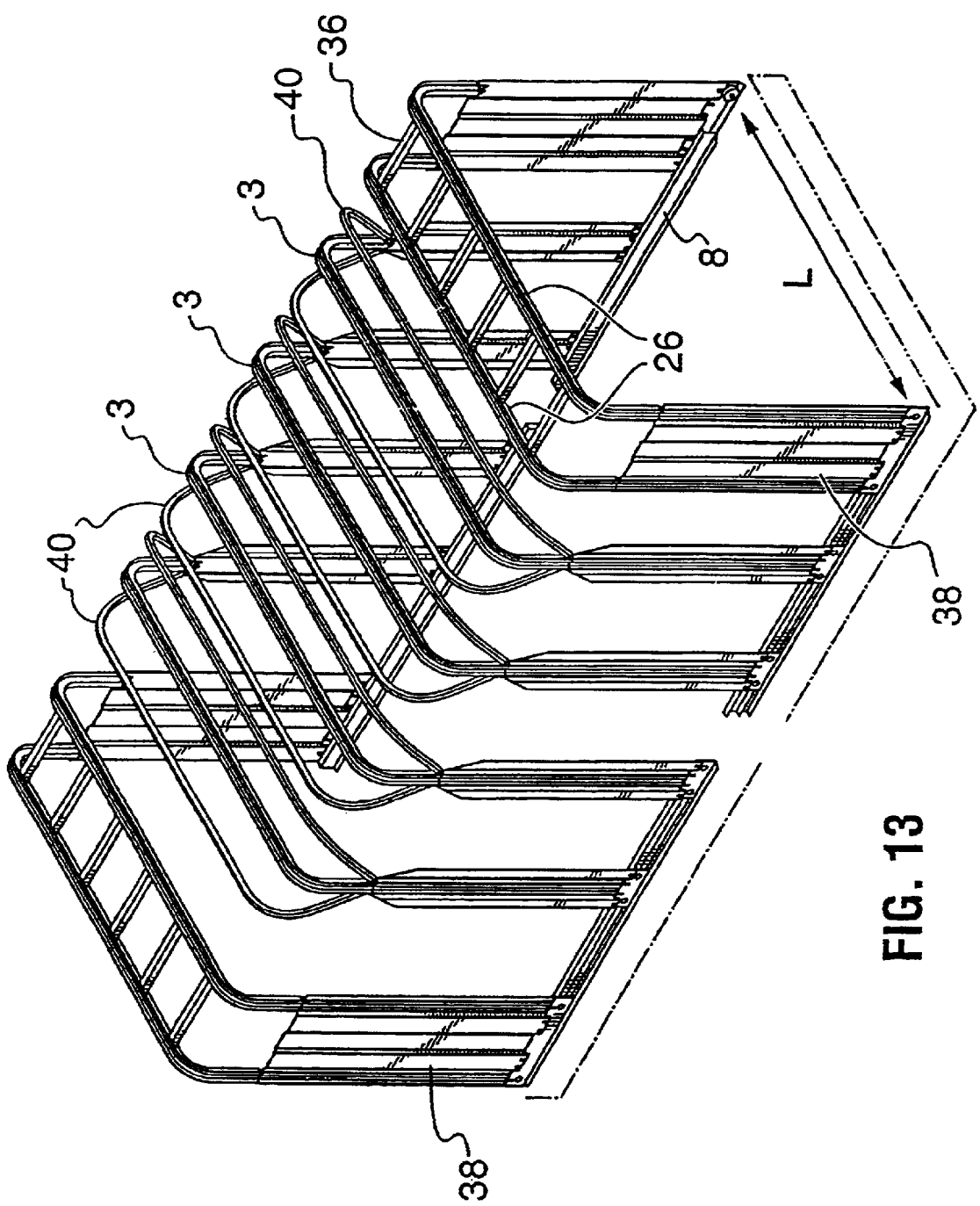
FIG. 13 is a perspective view of a portion of a system in accordance with the present invention, with the tarpaulin sections removed, to more clearly illustrate the interrelationship of the components of the system and their operation.

A portion of a convertible tarpaulin support system (2), without the canvas portions, in accordance with the invention is illustrated in FIG. 13, with a rigid end double bow support (38) associated with a number of single intermediate bow tarpaulin supports (3), all slidably mounted on tracks (8). As can be clearly seen in this view, the lateral inside clearance (L), when the system is in open position, is greater than would have otherwise been the case with the conventional construction having bow members (10) extending right to a base plate (22). In addition, as illustrated in FIGS. 7 and 13, to enhance the support of tarpaulin sections (12) when in position, a pair of inverted U-shape support braces (40) are pivotally secured to arms (28) of bows (26), so that these brace bows can pivot into position adjacent their corresponding bow portions (26) when the support system is moved to open (covering) position, to provide further support for corresponding tarpaulin sections (12).

Thus, it is apparent that there has been provided in accordance with the invention a wide clearance sliding tarping system for flat bed trailers or truck bodies that fully satisfies the objects, aims and advantages set forth above. While the invention has been described in conjunction with an illustrated embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A tarpaulin support for a tarpaulin system that converts a flat bed trailer into a fully covered trailer and back again into an open flat bed trailer, as desired, the support comprising:

(a) an upper tubular bow of inverted U-shape to extend laterally across a trailer, each side of the bow having a lateral, downwardly extending tubular arm;

(b) a structural member secured to the tubular bow along its outer periphery and extending below the free ends of the arms of the tubular bow, the structural member provided with means to secure thereto peripheral portions of tarpaulin sections for covering the trailer;

(c) a pair of planar bases associated with the bow, one on each side, each base having roller means secured thereto for sliding movement on a different one of a corresponding rail mounted on a corresponding side of the flat bed, and;

(d) corrugated plates having vertically formed corrugations secured to each structural member below the corresponding arm and its associated base, the corrugated plates having sufficient structural strength to support the tubular bow and its structural member and associated tarpaulin sections when in position,
wherein the overall thickness of the corrugated plate between opposite surfaces is less than that of the tubular bow.

2. A tarpaulin support according to claim 1, wherein, when in position, the plates constitute a significant portion of the height of the sides of the flat bed trailer.

3. A tarpaulin support according to claim 2, wherein the arms of the tubular member extend downwardly about one and half feet on each side of the central transverse portion.

4. A tarpaulin support according to claim 2, wherein the tubular member is of square cross-section, with the sides of the square being about two inches wide, and wherein the thickness of the plate between opposite surfaces of each plate and its corrugations is no greater than three-quarters of an inch.

5. A tarpaulin support according to claim 4, wherein the plate is made of material about three eighths of an inch thick.

6. A tarpaulin support according to claim 1, wherein the securing means comprise aligned finger-jointed slots in the corrugations of each plate, the slots providing a lateral clearance sufficient to securely engage a corresponding base by allowing an upper edge of that base to slide into the corrugated plate.

7. A tarpaulin support according to claim 6, wherein bolts further secure the plates to their respective bases.

8. A tarpaulin support according to claim 1, wherein the plates are welded to the structural member.

9. A tarpaulin support according to claim 1, wherein the plates are bolted to the structural member.

10. A tarpaulin support according to claim 3, wherein a pair of uplifting bows are pivotally secured to lower ends of the arms of the upper tubular bow member to support the tarpaulin during movement of the tarpaulin support.

11. A tarpaulin support according to claim 1, wherein the structural member comprises a planar body extending between peripheral, outwardly opening grooves for firmly securing beaded sides of adjacent sections of tarpaulin.

12. A tarpaulin support for a tarpaulin system that turns a flat bed trailer into a fully covered van and back again into an open flat bed trailer, as desired, the support comprising:

(a) a pair of upper tubular bows of inverted U-shape to extend laterally across the trailer in parallel fashion, each side of each of the bows having a lateral, downwardly extending tubular arm, of the bows having associated rigid braces extending between them to maintain the bows in their spaced parallel alignment;

(b) a structural members secured to each tubular bow along its outer periphery and extending below the free ends of the arms of the tubular bows, the structural members being provided with means to secure thereto peripheral portions of tarpaulin section for covering the trailer;

(c) a pair of planar bases associated with the bow, one on each side, each base having roller means secured thereto for sliding movement on a different one of a corresponding rail mounted on a corresponding side of the flat bed, and;

(d) corrugated plates having vertically formed corrugations secured to each structural member below the corresponding arm and its associated base, the corrugated plates having sufficient structural strength to support the tubular bow and its structural member and associated tarpaulin sections when in position, between the spaced tubular members,
wherein the overall thickness of the corrugated plate between opposite surfaces is less than that of the tubular bow.

13. A tarpaulin system that converts a flat bed trailer into a fully covered trailer and back again into an open flat bed trailer, as desired, the system comprising a plurality of tarpaulin supports according to claim 1, to be slidably supported in parallel, spaced fashion laterally across an open flat bed trailer on rail mounts on the sides of the trailer, adjacent tubular bows and associated structural members having secured thereto tarpaulin sections whereby, when in mounted position on a flat bed trailer, the tarpaulin supports may be moved to opened position to provide tarpaulin cover for the flat bed trailer or to closed position where the flat bed trailer is opened and not covered by tarpaulin.

14. A system according to claim 13, further comprising one or more tarpaulin supports according to claim 12 similarly slidably supported on the rail mounts.

* * * * *